United States Patent [19]

Brech

[11] Patent Number: 5,790,887
[45] Date of Patent: Aug. 4, 1998

[54] METHOD AND APPARATUS FOR PROCESSING PROGRAMMED INPUT/OUTPUT (PIO) OPERATIONS IN A COMPUTER SYSTEM

[75] Inventor: Brad Louis Brech, Rochester, Minn.

[73] Assignee: International Business Machines Corporation, Armonk, N.Y.

[21] Appl. No.: 601,681

[22] Filed: Feb. 15, 1996

[51] Int. Cl.⁶ .................................................. G06F 9/28
[52] U.S. Cl. .................. 395/825; 395/826; 395/841; 395/840
[58] Field of Search ..................... 395/825, 826, 395/841, 840, 474

[56] References Cited

U.S. PATENT DOCUMENTS

| | | | |
|---|---|---|---|
| 4,901,232 | 2/1990 | Harrington et al. | 364/200 |
| 4,939,644 | 7/1990 | Harrington et al. | 364/200 |
| 5,339,449 | 8/1994 | Karger et al. | 395/700 |
| 5,544,345 | 8/1996 | Carpenter et al. | 395/477 |
| 5,640,596 | 6/1997 | Takamoto et al. | 395/841 |

*Primary Examiner*—Lucien U. Toplu
*Attorney, Agent, or Firm*—Joan Pennington

[57] ABSTRACT

A method and apparatus are provided for processing programmed input/output (PIO) operations in a computer system. A batched list of PIO operations is stored in a buffer. Then the batched list of PIO operations is moved as a single system bus operation to an I/O bus interface unit. The I/O bus interface unit includes sequencer logic. The sequencer logic is used for executing the batched list of PIO operations and for providing an ordered sequence of PIO operations to a system I/O bus. The method and apparatus of the invention enhances the use of non-intelligent I/O adapters in a computer system by reducing the overhead of system PIO operations. Also the correctly ordered sequence of PIO commands provided by the sequencer logic facilitates the use of non-intelligent I/O adapters in reduced instruction-set computer (RISC) systems.

8 Claims, 3 Drawing Sheets

METHOD AND APPARATUS FOR PROCESSING PROGRAMMED INPUT/OUTPUT (PIO) OPERATIONS IN A COMPUTER SYSTEM

FIELD OF THE INVENTION

The present invention relates to a computer system, and more particularly to a method and apparatus for processing programmed input/output (PIO) operations in a computer system.

DESCRIPTION OF THE PRIOR ART

In computer systems, processor wait time and inefficient bus usage are problems resulting from the large and growing ratio between the instruction rate of available processors and the cycle time of input/output (I/O) bus operations. For example, in a computer system with a 15 ns processor clock, an intermediate system bus with a 150 ns bus operation, and an I/O bus with a 400 ns bus operation, the total time required or cost of an I/O cycle is in excess of 715 ns. This cost of 715 ns results from the summation of the above listed processor and bus times including two transfers on the intermediate system bus and assuming that all resources are available when needed and bus arbitration time is zero. The present large ratio is growing, as processor cycle times continue to fall, while I/O buses remain relatively constant.

To add to the problem, a typical I/O adapter requires a range from 3 to 10 I/O operations to perform a single I/O transaction. The series of I/O operations sometimes requires specific ordering. For example, in response to an interrupt, the adapter software may need to perform two reads to understand the nature of the interrupt, then perform six ordered writes to clear the interrupt and set up the next operation and a final read to check status. In all, 429 processor cycles are used just for the I/O requests, not including the cycles to interpret the data read, and getting a next operation set up.

One characteristic of reduced instruction-set computer (RISC) processors is that PIO requests are not always executed in the order in which they appear in the software. Because the instruction rate of the processors is orders of magnitude faster than the execution of PIO operations on the I/O bus, reordering of the software instructions is provided, and reordering can improve overall performance.

In many I/O adapters, the order of PIO operations is critical to the proper functionality of the device. Known software implementations used to force sequencing for RISC processors typically are complex, and adversely impact performance. Some software implementations use RISC instructions, such as, SYNCH and EIEIO, which force the processor to wait for the PIO operation to complete. Other implementations have required more complex and expensive I/O hardware. For example, for some known architectures, such as a subsystem control block (SCB) and a single channel control word (CCW), special hardware or an I/O processor is required on the adapter end of the system I/O bus to parse control blocks.

An I/O processor controller typically is used with I/O adapter hardware due to the speed difference between the main system bus and the system I/O bus, higher level commands are used between a central electronics complex (CEC) and the I/O processor to reduce the I/O overhead on the main system bus and the system I/O bus. As a result, fewer I/O commands are required on the main system and system I/O buses. The I/O processor is required to change the high level command into the series of individual read/write commands that the I/O Adapter hardware needs to function. Using the I/O processor adds to development cost, product cost, and maintenance cost to the product.

SUMMARY OF THE INVENTION

A principal object of the present invention is to provide an improved method and apparatus for processing programmed input/output (PIO) operations in a computer system.

In brief, a method and apparatus are provided for processing programmed input/output (PIO) operations in a computer system. A batched list of PIO operations is stored in a buffer. Then the batched list of PIO operations is moved as a single system bus operation to an I/O bus interface unit. The I/O bus interface unit includes sequencer logic. The sequencer logic used for executing the batched list of PIO operations and for providing an ordered sequence of PIO operations to a system I/O bus.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1B:
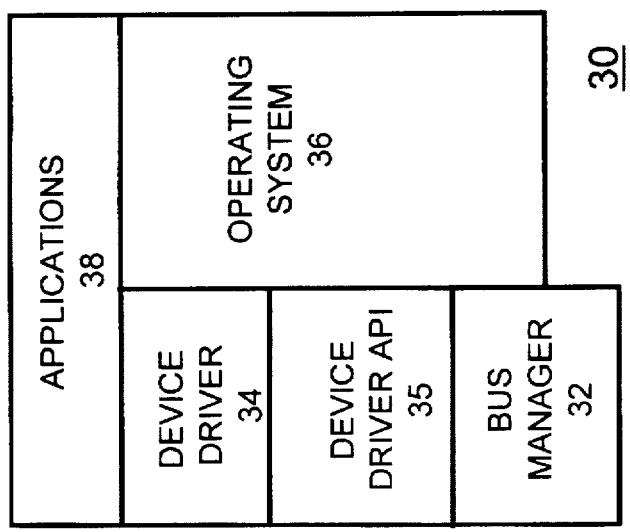
FIG. 1B is a block diagram illustrating a software structure for the system of FIG. 1A.
Figure 1A:
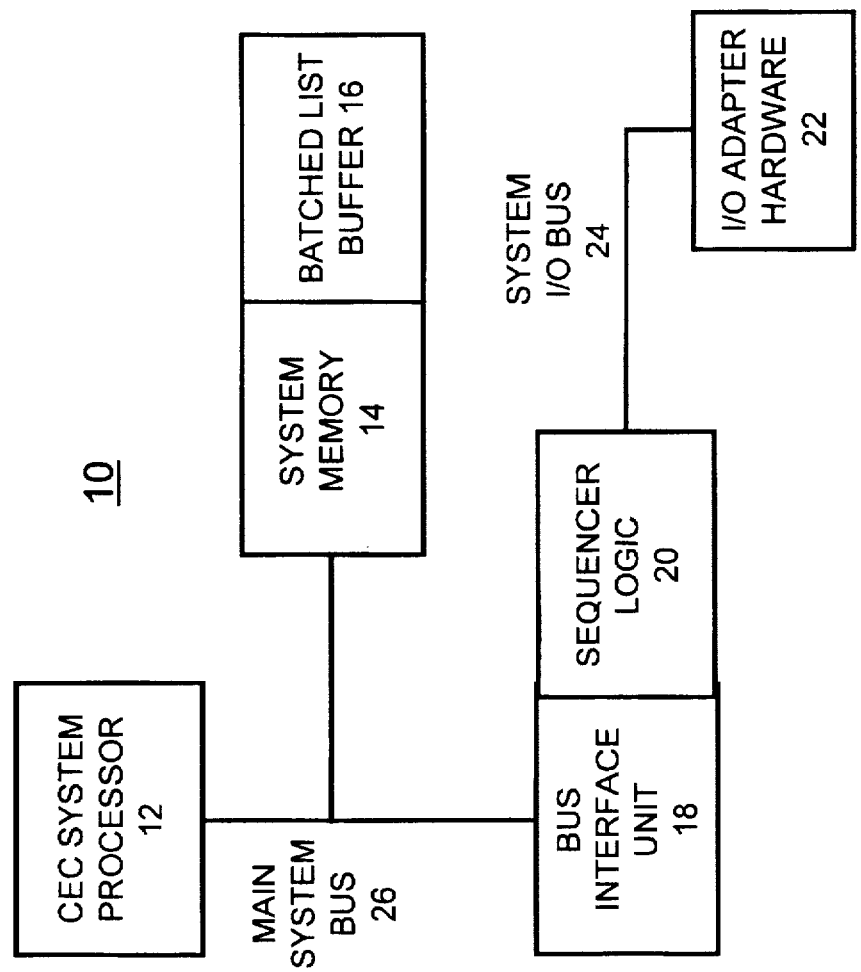
FIG. 1A is a block diagram illustrating a computer system for implementing a programmed input/output (PIO) operations processing method in accordance with the present invention.

Referring now to the drawings, in FIG. 1A there is shown a block diagram representation of an exemplary computer system generally designated by 10 for performing an I/O operations processing method of the invention. As illustrated, the exemplary computer system 10 includes a central electronics complex (CEC) system processor generally designated by 12. CEC system processor 12 is coupled to a system memory or main store generally designated by 14. A batched list buffer 16 in accordance with the invention is provided within the system memory 14. A bus interface unit 18 including a sequencer logic 20 in accordance with the invention is coupled to one or more I/O adapter hardware unit(s) 22 via a system I/O bus 24. A main system bus 26 connects the CEC system processor 12, the system memory 14, and the bus interface unit 18.

The bus interface unit 18 includes logic that connects the main system bus 26 to the system I/O bus 24. The bus interface unit 18 is often called a host bridge. The I/O adapter hardware 22 represents an I/O card that provides a peripheral service to the system 10. For example, this peripheral service includes storage media and communications connections. The I/O adapter hardware 22 is usually controlled with a series of individual read/write commands on the I/O bus 24. These commands are either I/O or memory mapped address register locations.

In accordance with features of the invention, bus overhead is reduced by batching the PIO requests into functional groups or batched lists in batched list buffer 16, and sending these groups across the system bus 26 in place of multiple individual requests. By providing the I/O bus interface unit 18 with the sequencer 20 to execute on a queue of PIO operation requests and to insure the queue to be a first-in first-out (FIFO) queue, required PIO operation sequence is provided. The invention enables the use of non-intelligent I/O adapters 22, because a correctly ordered sequence of PIO commands is provided. Typically, computer system 10 includes an I/O bus interface unit 18. The added hardware cost to provide the sequencer logic 20 of the invention is minimal, and is a one time system cost. A feature of locating the sequencer 20 at the bus interface unit 18 is that error recovery can be automatically distributed and kept at a lowest possible level. For example, some adapter bus errors can be retried without affecting the instruction stream, further enhancing the overall performance of system 10.

By providing a software mechanism and a sequencer logic 20 in the bus interface unit 18, the main system bus 26 can still operate at its higher speed for many batches of I/O commands. The sequencer logic 20 in the bus interface unit 18 executes multiple individual I/O commands, and responds back to the CEC processor 12 in a single response.

In FIG. 1B, there is shown a software structure generally designated by 30 for the system 10. The software structure 30 of FIG. 1B executes on the CEC system processor 12 of FIG. 1A. The software structure 30 includes a bus manager 32, a device driver 34, a device driver application program interface (API) set 35, an operating system 36 and applications 38. The bus manager 32 and the device driver API 35 are an extension of operating system 36 implemented to provide a standard interface to the I/O bus structure consisting of the main system bus 26, the bus interface unit 18, the sequencer logic 20 and the system I/O bus 24. The bus manager 32 eliminates the need for the device drivers 34 to be bus specific, and is therefore more portable to different computer systems 10. Known implementations in conventional operating systems 36 can be used for the bus manager 32. The use of bus manager 32 enables better scheduling techniques and bus functional enhancements.

The device driver API set 35 is provided to deal with reading and writing bus locations, either I/O or memory space to work with the sequencer logic 20. The device driver API set 35 provides services to device driver 34 to read/write single locations, multiple random locations, and multiple locations within a block. For simple operations the values can be passed as API parameters, and for others, control blocks can be used.

The device driver API set 35 replaces I/O requests with enqueue requests, which place the desired PIO operation on the sequencer FIFO queue. The sequencer 20 then executes on the FIFO queue in an ordered fashion. While the queue can be located in different places, two logical locations are system memory 14 and the I/O bus interface chip 18. With the queue located in memory 14, the operating system software 36 provides a queue for the PIO for functional application software 38 to use. A pointer to the in-memory queue is loaded at the time of initial program load (IPL) into the I/O bus interface chip 18, which use the pointer to start processing the queue. Then sequencer logic 20 contains logic to detect when the queue is empty, or when the queue is at the end, and needs to return to the top for processing. Also the FIFO queue can be implemented in the I/O bus interface chip as shown in FIG. 2 illustrating the sequencer logic 20.

Once a call to the bus manager 32 is made, the request is either queued because the resources are not available or executed immediately. The bus manager 32 then gives the request to the sequencer logic 20 to be executed. This is accomplished by passing a pointer to the sequencer logic 20 that points to the request in system memory 14. The sequencer logic 20 executes the request, moves the results (if required) to memory, and notifies the bus manager 32 that the request is complete. Although this requires some overhead, the main CPU cycles saved and the improved scheduling efficiencies enables a multiprocessing operating system 36 to run faster and be further isolated from the relatively slow I/O bus 24. The combination bus manager 32 and sequencer logic 20 enables lower cost, higher performance and fault tolerant I/O subsystems.

Figure 2:
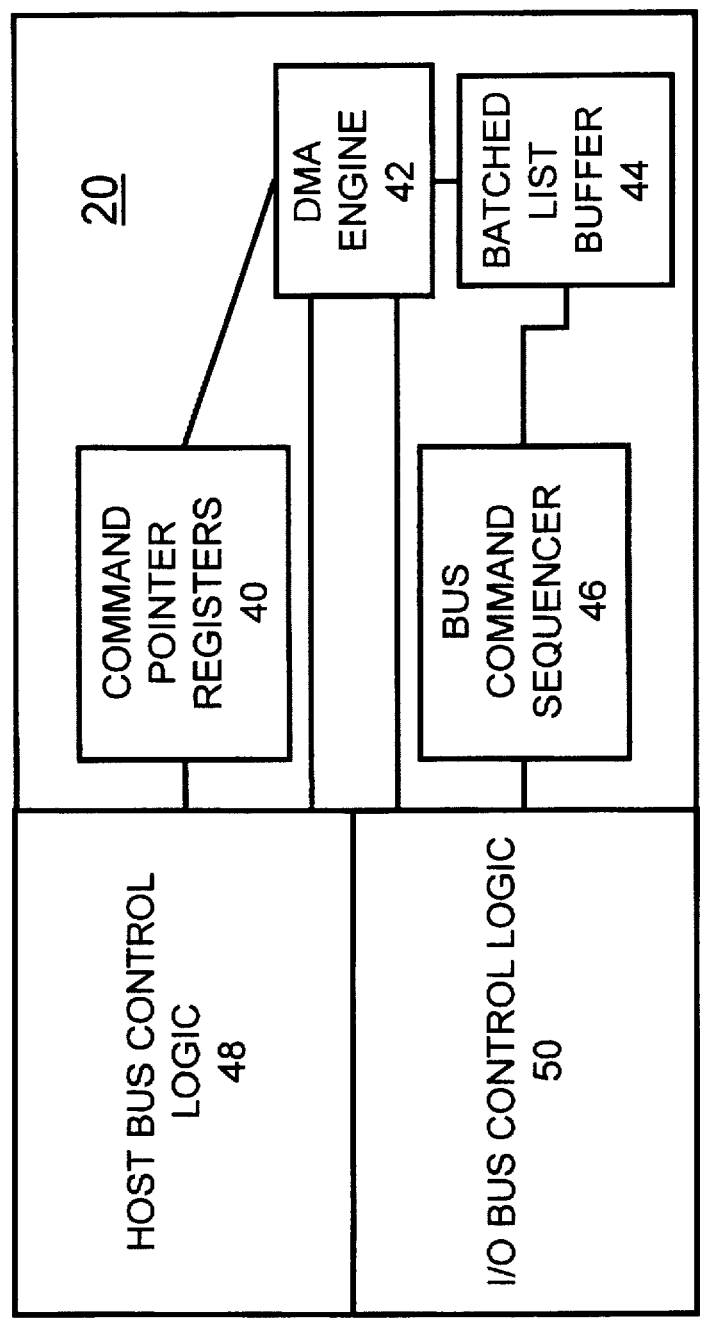
FIG. 2 is a more detailed view of a sequencer logic of the computer system of FIG. 1A.

Referring now to FIG. 2, an expanded view of exemplary sequencer logic 20 is provided. Sequencer logic 20 includes a plurality of command pointer registers 40 coupled to a direct memory access (DMA) engine 42, a batched list buffer 44, and a bus command sequencer 46. A host bus control logic 48 is connected to the command pointer registers 40 and the DMA engine 42. An I/O bus control logic 50 is connected to the bus command sequencer 46 and the DMA engine 42. Bus command sequencer 46 provides a first-in/first-out (FIFO) queue mechanism that is used to insure the ordered sequence of programmed I/O operations in a RISC based system 10 that by nature otherwise reorders PIO sequence. The number of command pointer registers 40 is an implementation option. The command pointer registers 40 hold the pointer to the batched I/O list. The DMA engine 42 then automatically moves the list to the batched list buffer 44. This can also be done with memory writes if the list is small. Once in the buffer 44, the bus command sequencer 46 takes the list, executes the list items, and return the results to the buffer. When complete, the sequencer 46 triggers the DMA engine 42 to return the results to memory, and notify the bus manager software 32.

Figure 3:
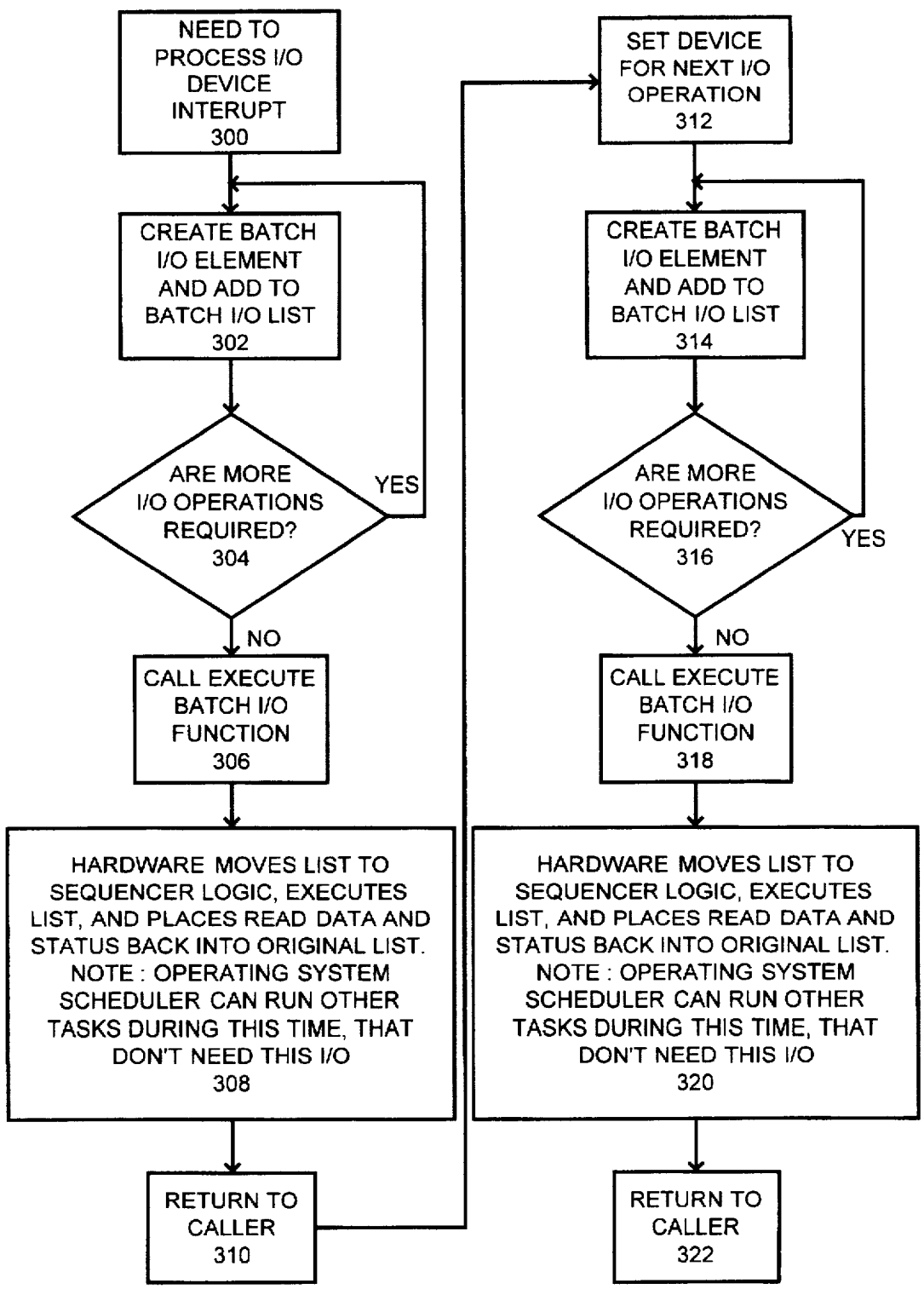
FIG. 3 is a logic flow diagram illustrating a method for processing programmed PIO operations in the computer system of FIG. 1A.

Referring to FIG. 3, there is shown a flow chart illustrating the method of the invention for processing PIO operations in the computer system 10. The sequential steps begin at a block 300 to process an I/O device interrupt by CEC system processor 12. For example, multiple PIO reads may be added to the PIO queue. A batch I/O element is created and added to the batch I/O list buffer 16 by the CEC system processor 12 as indicated at a block 302. It is determined by CEC system processor 12 whether more I/O operations are required as indicated at a decision block 304, for example, for each of the multiple reads. If yes, then a next I/O element is created and added to the batch I/O list buffer 16 by CEC system processor 12. When no additional I/O operations are required, an execute batch I/O function is called by the CEC system processor 12 as indicated at a block 306. Then the batch I/O list is moved to the sequencer logic 20, the DMA engine 42 executes the list and places read data and status data back into the original list while the operating system scheduler can run other task during this time that do not need this I/O as indicated at a block 308. Then a return value is passed to the CEC system processor 12 and the read data is returned to the requesting caller as indicated at a block 310. The device is set for a next I/O operation as indicated at a block 312.

A batch I/O element is created and added to the batch I/O list buffer 16 as indicated at a block 314. For example, multiple PIO writes may be added to the PIO queue. It is determined whether more I/O operations are required as indicated at a decision block 316. If yes, then the I/O elements are created and added to the batch I/O list buffer 44. For example, multiple PIO writes including writes 1–6 are added to the PIO queue. When no additional I/O operations are required, for example, after the last write 6 has been added to the PIO queue, an execute batch I/O function is called as indicated at a block 318. Then the writes 1-6 in the batch I/O list are moved to the sequencer logic 20, the DMA engine 42 executes the list by sequentially passing write 1 to write 6 to the I/O adapter hardware 22 and read follow in order. The read data and status data is placed back into the original list while the operating system scheduler can run other task during this time that do not need this I/O as indicated at a block 320. Then a completion response status is passed to the CEC system processor 12 and then the completion response returned to caller as indicated at a block 322.

The following description provides an example of an application program interface (API) set that can be used to implement the invention. This interface is implemented as a function call by default. Using a predetermined directive, called a PIO_MACROS directive, during compile, forces the pre-processor to replace this call by a macro implementation in the user's source code.

An additional service named, ascIOBatchExecute function available at the user level, kernel level, and interrupt level is provided for requesting the execution of the prebuilt batch of PIO operations.

The ascIOBatchExecute function passes a predefined data type structure, a PIO_Batch_List_t, to start execution of the PIO operations. The ascIOBatchExecute function is used to provide a batched interface for performance reasons. Many adapters require a specific I/O sequence each time an action is to be performed. The ascIOBatchExecute function allow an add to build the sequence once, and then just re-executing the batch command each time and working from a buffer is used.

The ascIOBatchExecute function uses a prepared buffer containing the PIO_Batch_List_t structure as the source of a series of PIO operations to be performed. The ascIOBatchExecute function operation can include several reads and writes that execute in the order as defined by the PIO_Batch_List_t structure, yet are executed in one command from the client or CEC processor 12. The ascIOBatchExecute function is used for performance reasons, and allows for intelligent bus implementations.

The ascIOBatchExecute function includes a predefined parameter, called a *BufferAddress providing a pointer to the PIO_Batch_List_t structure to be used for this operation, such as a number of reads. A Return Value is provided, such as, ASC_SUCCESS where the entire list was successfully completed. Alternatively, a Return Value, ASC_ERROR is provided where an item in the list was not completed, or completed with error. All entries in the list after the one in error are not executed element return codes to identify the element in error. The ascIOBatchExecute function interface synchronizes the processor's pipeline and then executes the I/O operations appropriate for the pre-defined PIO Batch Elements.

Another function called an ascIOWriteBuffer writes a number of elements from a buffer, and places them into consecutive I/O addresses. The ascIOWriteBuffer function supports devices where a buffer is placed in an I/O address range. The ascIOWriteBuffer function uses a prepared buffer as the source of a byte stream retrieved to be written to an I/O address range through multiple writes. The exact origination address is calculated by adding an offset to the start value of the I/O address range represented by an address of the PIO structure, called piop.

Another function called an ascIOReadBuffer reads a number of elements from consecutive I/O addresses, and places them into a buffer. The ascIOReadBuffer function supports devices where a buffer is placed in an I/O address range. The ascIOReadBuffer function uses a prepared buffer as the destination of a byte stream retrieved from a single I/O address range through multiple reads. The exact origination address is calculated by adding offset to the start value of the I/O address range represented by piop.

The pio_batch_element_t is a data type or structure for describing an element on the batched PIO list. An example synopsis of pio_batch_element_t follows:

```
[1] typedef struct pio_batch_element {
[2]     unit 8, size;
[3]     unit 8, flag;
[4]     unit16, return code;
[5]     vm_offset_t, offset;
[6]     unit 32, data;
[7] } pio_batch_element_t;
```

The pio_batch_element_t structure contains an individual PIO request contained within the pio_batch_list_t.

The fields of the pio_batch_element_t structure are dependent on the addressing model of the task. This updated pio_batch_element_t structure is given to the operating system kernel to support the PIO functionality with interrupt services. The fields of pio_batch_element_t structure are defined as follows:

| | |
|---|---|
| size | [in] Coded size for the operation. |
| | Supported values at this time are, for example, 8, 16, and 32 bits. |
| flag are: | [in] Examples of supported flag values |
| Flag Location | Flag meaning |
| xxxx xxx1 | Read/Write: When this bit is a '0', a read operation will be executed. When this bit is a '1', a write operation is executed. |
| xxxx xx1x | Transparent Retry: When this bit is set to a one, the PIO service will retry the operation if an error occurs that it can retry. The retry limit is platform dependent. When a client uses this bit, it must ensure that the failed read or write operation has had no side effects that it cannot recover from. |
| return code | [out] This field contains return code information on the execution of the requested operation. A '00'X return code is for success. |
| offset | [in] Displacement from the start of the I/O address range. |
| data | [in/out] Data to be used for a write, or data returned from a read. The data for a byte operation, the most significant byte is used for a 2 byte operation, the most significant 2 bytes is used. |

Next the pio_batch_list_t is a data type structure for describing the elements on a batched PIO list. An example synopsis of pio_batch_list_t structure follows:

```
[1] typedef struct pio_batch {
[2]     pio_info_t, *piop,;
[3]     unit 16, num_elements;
[4]     unit16, return_code;
[5]     pio_batch_element_t, batch_element;
[6] } pio_info_t;
```

The pio_batch_t structure contains the list of PIO operations the user wants to have operated on in a single add services call. The pio_batch_t structure allows for a mix of reads, writes and sizes.

The fields of The pio_batch_t structure are dependent on the addressing model of the task. This updated pio_batch_t structure is given to the operating system kernel to support the PIO functionality with interrupt services. The fields of the pio_batch_t structure are defined as follows:

--- piop　　　　　　　[in] Address of the PIO structure. This structure must have the I/O address mapped into the caller's address space for this call to be successful.
num_elements　　[in] The number of pio_batch_element_t structures in the list. A valid range is between 1 - 32 decimal.
return_code　　　[out] A single return code for the entire operation. A '0000'h denotes success for the entire batch request. A '1111'h denotes an error in the batch request. The individual operation return codes in the pio_batch_element_t entries provide additional information.
batch_elements　[in/out] The pio_batch_element_ts. On return, this structure contains return code and read data.

---

While the present invention has been described with reference to the details of the embodiments of the invention shown in the drawing, these details are not intended to limit the scope of the invention as claimed in the appended claims. For example, it should be understood that the present invention advantageously can be utilized in a computer system 10 with a mezzanine bus controller (not shown) between the CEC system processor 12 and the bus interface unit 18.

What is claimed is:

1. An apparatus for processing programmed input/output (PIO) operations in a computer system comprising:
   a central electronics complex (CEC) system processor for creating and adding batch elements to define a batched list of PIO operations;
   buffer means coupled to said central electronics complex (CEC) system processor for storing said batched list of PIO operations;
   I/O bus interface means coupled to said buffer means by a system bus for receiving said batched list of PIO operations as a single system bus operation; and said I/O bus interface means including;
   sequencer means for executing said batched list of PIO operations and said sequencer means for providing an ordered sequence of PIO operations to a system I/O bus.

2. An apparatus for processing programmed input/output (PIO) operations as recited in claim 1 wherein said sequencer means further includes a command pointer register for storing a pointer to said batched list of PIO operations; a sequencer batched list buffer for storing said batched list of PIO operations and wherein said batched list sequencer executing means moves said batched list of PIO operations to said sequencer batched list buffer utilizing said pointer.

3. An apparatus for processing programmed input/output (PIO) operations as recited in claim 1 wherein said sequencer means further includes means for passing a return value to said central electronics complex (CEC) system processor responsive to executing said batched list of PIO operations.

4. An apparatus for processing programmed input/output (PIO) operations as recited in claim 1 wherein an I/O adapter is coupled to said system I/O bus; said I/O adapter comprises a non-intelligent adapter that provides a peripheral service to the computer system.

5. A method for processing programmed input/output (PIO) operations in a computer system comprising the steps of:
   utilizing a central electronics complex (CEC) system processor for creating and adding batch elements to define a batched list of PIO operations and storing said batched list of PIO operations in a buffer in a main system memory;
   moving said batched list of PIO operations as a single system bus operation to an I/O bus interface unit; said I/O bus interface unit coupled to said buffer by a system bus and said I/O bus interface unit provided with a sequencer logic unit;
   utilizing said sequencer logic unit in said I/O bus interface for executing said batched list of PIO operations and for providing an ordered sequence of PIO operations to a system I/O bus.

6. A method for processing programmed input/output (PIO) operations as recited in claim 5 further includes the step of passing a return value to said central electronics complex (CEC) system processor responsive to executing said batched list of PIO operations.

7. A method for processing programmed input/output (PIO) operations as recited in claim 5 wherein the step of moving said batched list of PIO operations as a single system bus operation to said I/O bus interface unit includes the steps storing a pointer in a sequencer command pointer register in said sequencer logic unit and moving said batched list of PIO operations to a sequencer batched list buffer utilizing the pointer.

8. A method for processing programmed input/output (PIO) operations as recited in claim 5 wherein the step of utilizing said sequencer logic unit in said I/O bus interface for executing said batched list of PIO operations includes the steps of executing multiple individual I/O commands and responding back to an electronics complex (CEC) system processor in a single response.

* * * * *